United States Patent [19]
Vickery

[11] Patent Number: 5,667,559
[45] Date of Patent: Sep. 16, 1997

[54] APPARATUS AND METHOD FOR REMOVING VOLATILE ORGANIC COMPOUNDS FROM AN AIR STREAM

[75] Inventor: Earl Vickery, San Jose, Calif.

[73] Assignee: On-Demand Environmental Systems, Inc., San Jose, Calif.

[21] Appl. No.: 644,327

[22] Filed: May 10, 1996

Related U.S. Application Data

[63] Continuation of Ser. No. 415,250, Apr. 3, 1995, Pat. No. 5,538,541.

[51] Int. Cl.⁶ .................................................. B01D 53/08
[52] U.S. Cl. .......................... 95/110; 95/143; 96/123; 96/150
[58] Field of Search .................... 95/107–112, 143; 96/110, 115, 123, 150; 422/177, 178, 213, 214, 232, 233

[56] References Cited

U.S. PATENT DOCUMENTS

| | | | |
|---|---|---|---|
| 1,522,480 | 1/1925 | Allen | 95/112 |
| 1,547,924 | 7/1925 | Kerschbaum | 95/110 |
| 2,397,566 | 4/1946 | Schutte | 96/123 |
| 2,921,970 | 1/1960 | Gilmore | 95/111 X |
| 3,177,631 | 4/1965 | Tamura | 55/28 |
| 3,798,876 | 3/1974 | Kennedy | 55/59 |
| 3,892,551 | 7/1975 | Burnham | 96/115 |
| 4,147,523 | 4/1979 | Izumo | 96/150 X |
| 4,207,082 | 6/1980 | Okamoto et al. | 55/60 |
| 4,231,764 | 11/1980 | Mattia | 55/28 |
| 4,257,783 | 3/1981 | Gutjahr et al. | 95/112 |
| 4,259,094 | 3/1981 | Nagai et al. | 96/123 |
| 4,863,494 | 9/1989 | Hayes | 55/59 |
| 4,869,734 | 9/1989 | Jacquish | 95/111 |
| 4,946,479 | 8/1990 | Izumo | 96/123 |
| 5,238,658 | 8/1993 | Makioka et al. | 95/90 |
| 5,288,307 | 2/1994 | Goltz et al. | 95/143 |
| 5,460,789 | 10/1995 | Wilhelm | 422/177 X |
| 5,538,541 | 7/1996 | Vickery | 96/123 |

FOREIGN PATENT DOCUMENTS

| | | | |
|---|---|---|---|
| 0479931 | 1/1952 | Canada | 95/110 |
| 0533037 | 9/1931 | Germany | 96/150 |
| 0877445 | 5/1953 | Germany | 96/150 |
| 1006397 | 4/1957 | Germany | 96/110 |
| 54-100976 | 8/1979 | Japan | 96/150 |

*Primary Examiner*—Robert Spitzer
*Attorney, Agent, or Firm*—Carr, DeFilippo & Ferrell, LLP

[57] ABSTRACT

An apparatus and method for removing volatile organic compounds from an air stream wherein airborne adsorbent material is mixed with contaminated exhaust air in a vertical main column. Volatile Organic Compounds (VOCs) within the exhaust air adhere to the adsorbent material and are thus removed from the air. The clean air exits the system and the saturated adsorbent material falls through the bottom of the main column and into a lower reservoir. The saturated adsorbent material is desorbed and recycled through the adsorber apparatus by being drawn up from the lower reservoir through a secondary column and deposited at the inlet to the main column. At the top end of the main column, the adsorbent material is once again dropped into the contaminated exhaust air flowing through the main column. This process is constant and adsorbent material is continuously being recycled through the system.

21 Claims, 2 Drawing Sheets

5,667,559

APPARATUS AND METHOD FOR REMOVING VOLATILE ORGANIC COMPOUNDS FROM AN AIR STREAM

This is a continuation of application Ser. No. 08/415,250, filed on April 3, 1995, U.S. Pat. No. 5,538,541.

BACKGROUND OF THE INVENTION

1. Field of the Invention

This invention relates generally to an improved system for purifying contaminated air, and more particularly to a falling bed adsorber for removing organic contaminants from exhaust air using adsorbent material, where a minimal amount of system air pressure is required.

2. Description of the Background Art

In the prior art, methods of removing Volatile Organic Compounds (VOCs) from contaminated air include fixed bed adsorbers and fluidized bed adsorbers. Fixed bed adsorbers are the most common method, and comprise a canister containing adsorbent particles of a polymer through which contaminated air is passed. The VOCs in the contaminated air are deposited onto the polymer by adsorption or absorption, or a combination of both. The air exiting the canister is largely devoid of the VOCs. One downfall of this type of system is that, eventually, the polymer in the canister becomes saturated with the VOCs removed from the contaminated air and must be replaced. Although most polymers can be reconditioned and reused, it is very costly to continually change canisters and recondition the polymer. Another problem with fixed bed adsorbers is that they are quite large due to the fact that the particles of adsorbent polymer in the bed contact each other, thereby reducing the exposed surface area of each particle that is available for contact with the VOCs. In addition, a great amount of system air pressure is required to force the contaminated air through the material within the canister.

Fluidized bed adsorbers comprise "sieve trays" for flat beds atop which the adsorbent particles are placed, where each bed has a plurality of holes in its base that allow the contaminated air to pass through without allowing the adsorbent particles to fall through the holes. Fluidized beds were created to distribute contaminated air through layers of adsorbent polymer in a more uniform way in an effort to increase efficiency. As the velocity of the contaminated air passing through the bed is increased, the adsorbent particles separate slightly and expose more of their surfaces to the air stream. At some point, the air velocity causes the adsorbent particles to act as a fluid, and causing bubbles to be formed in the air as the contaminated air passes through the bed. The problem with bubbles is that only the outer surface of the bubble is exposed to the adsorbent particles, and thus a reduced amount of VOCs are adsorbed onto the polymer and removed from the air stream. Another problem with fluidized bed systems is that two or more beds must be used so that the air bubbles created in the first bed are broken by the next bed in order to expose more of the contaminated air to the adsorbent particles.

Although the pressure required to pass the contaminated air through a series of fluidized beds is less than that required to pass contaminated air through a fixed bed adsorber, still a relatively large pressure drop is realized across the adsorbers in fluidized beds. In other words, a high amount of pressure is required to force the contaminated air through the holes in the sieve trays and through the layer of adsorbent material atop the sieve tray. Since higher system pressures require larger fans with more horsepower, this system is undesirably large and consumes a considerable amount of energy.

What is needed is a low pressure adsorbent system that efficiently mixes contaminated air with adsorbent material such that the full surface of the adsorbent material is exposed to the contaminated air, and a system that also reconditions the saturated adsorbent material and recycles it back into the system.

SUMMARY OF THE INVENTION

The present invention is an apparatus and method for removing volatile organic compounds from contaminated exhaust air. Adsorbent material is dropped in to a main column through which contaminated air is passed in a counter-current direction. As the adsorbent particles travel down through the contaminated exhaust air, the Volatile Organic Compounds (VOCs), which are the contaminants in the exhaust air, adhere onto the adsorbent particles and are therefore removed from the exhaust air. The adsorbing system of the present invention excels in efficiency because: 1) the adsorbent material is suspended within a column of contaminated air so that the whole surface area of the adsorbent material is exposed to the contaminated air, and 2) the pressure required to move the contaminated air is considerably less than that of the prior art. For example, where the pressure drop in a fixed bed system is approximately 30 inches water column per foot, the pressure drop in a fluidized bed system is four inches to ten inches water column. However, under the same conditions, the pressure drop in the system of the present invention is a greatly reduced 0.03 inch water column.

The apparatus of the present invention comprises an airflow managing portion and an adsorbent material recycling portion. The airflow managing portion further comprises a tubular main column, centrally disposed within the system, an inlet port at the lower end of the main column and an exit port at the upper end of the column. Contaminated exhaust air enters the main column at the inlet port, and is mixed with the adsorbent material within the main column which removes the VOCs therefrom. The clean air then exits the main column through the exit port. A main blower, positioned near the exit port draws the clean air out of the main column. The vacuum pressure in the main column created by the main blower causes the exhaust air to be drawn into the main column.

The adsorbent material recycling portion further comprises a secondary column for transferring adsorbent material to the upper end of the main column, a lift blower for drawing the adsorbent material upwardly through the secondary column, and reservoir which contains the bulk of the adsorbent material utilized by the system. A first funnel disposed at the inlet to the main column and a second funnel disposed at the main column's exit enhance the efficiency of the removal and recycling of the adsorbent material.

In operation, the contaminated exhaust air and the adsorbent material are mixed within the main column. Activation of the main blower creates a vacuum within the main column which causes the contaminated exhaust air to flow into the main column. The exhaust air then flows up the main column, through the exit port and out the exit tube. Within the main column, the contaminated exhaust air mixes with the adsorbent material. A reservoir of adsorbent material is maintained at the top portion of the main column, and directs the adsorbent material into the main column via the first funnel. Gravity causes the adsorbent material to float downwardly within the main column, mixing with the contaminated exhaust air. This contact method exposes the entire surface of each particle of adsorbent material to the exhaust air stream. The velocity of the exhaust air traveling upward within the main column reduces the rate at which the adsorbent material falls and controls the amount of time the adsorbent material is mixed with the contaminated air. As the adsorbent material becomes saturated with VOCs, the weight of the saturated adsorbent material causes it to fall into the second funnel disposed at the base of the main column. The saturated adsorbent material then passes through the funnel into a lower reservoir placed underneath the main column. From the lower reservoir, the adsorbent material is drawn up a secondary column to an upper reservoir, where it is again funneled into the main column and recycled through the system. The adsorbent material is recycled through the system until it can adsorb no more VOCs. Once fully saturated, the adsorbent material is desorbed by any one of the common desorbing processes and returned to the adsorber apparatus to be re-used.

In an alternative embodiment, the lower reservoir is replaced by a rotatable collection plate. An infrared lamp is provided for desorption of the saturated adsorbent material. In the alternative embodiment, once the adsorbent material reaches the bottom of the main column, it drops onto the collection plate. The clockwise rotation of the collection plate transfers the saturated adsorbent material from the main column to an infrared lamp which heats the adsorbent material and causes it to release the VOCs therefrom. The released VOCs are captured and output to a treatment facility. After the desorption, the clockwise rotation of the collection plate passes the reconditioned adsorbent material underneath the bottom end of the secondary column. The lift blower draws the reconditioned adsorbent material up from the collection plate, through the secondary column, and transmits the reconditioned adsorbent material to the top end of the main column, where the reconditioned adsorbent material is once again dropped and floated downwardly through the main column, to mix with more contaminated exhaust air.

DETAILED DESCRIPTION OF THE PREFERRED EMBODIMENT

Figure 1:
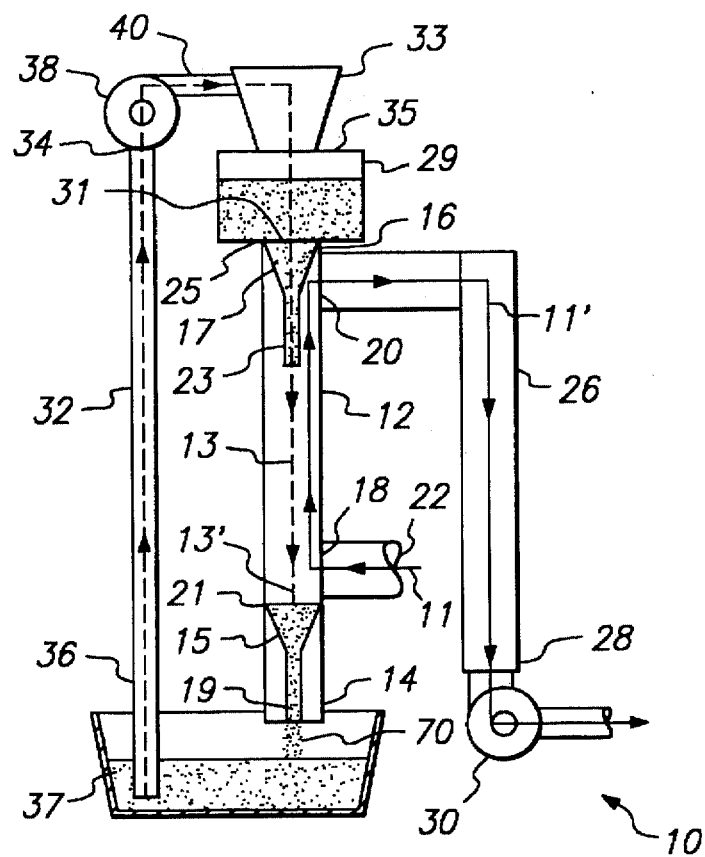
FIG. 1 is a front elevational view of a falling bed adsorber in accordance with the preferred embodiment of the present invention.

Referring now to FIG. 1, a front elevational view of a falling bed adsorber system 10 in accordance with the preferred embodiment of the present invention is illustrated. A tubular main column 12, centrally disposed within the system, has a first end 14, a second end 16, an inlet port 18 proximate the first end 14 and an exit port 20 proximate the second end 16. An inlet tube 22 positioned perpendicularly to the main column 12 is connected to the inlet port 18 such that contaminated exhaust air 11 flowing through the inlet tube 22 from a contaminated exhaust air source (not shown) enters the main column 12 through the inlet port 18. In the preferred embodiment, the main column 12 is thirty inches tall. The diameter of the main column 12 is a function of the maximum air flow rate allowable for the type of adsorbent material 13 being used in the system 10. This will be discussed in detail with respect to the operation of the system 10 to follow.

An exit tube 26 is connected perpendicularly to the exit port 20. The exhaust air 11 that enters the main column 12 through the inlet port 18 is purified within the main column 12 by being mixed with the adsorbent material 13. Clean air 11' exits the main column 12 through the exit port 20 and flows out the exit tube 26. The clean air 11' may be released into the environment, or directed toward another use. A main blower 30, positioned at the discharge end 28 of the exit tube 26, draws the clean air 11' out of the main column 12. The vacuum pressure within the main column 12 created by the pull of the main blower 30 causes the exhaust air 11 within the inlet tube 22 to be drawn through the inlet port 18 and up the main column 12.

A first funnel 15, disposed within the main column 12 proximate the first end 14, directs saturated adsorbent material 13' falling thereon out of the main column 12. The narrow end 19 of the first funnel 15 is positioned flush with the first end 14. The diameter of the wide end 21 of the first funnel 15 equals the inner diameter of the main column 12 in order to capture all of the adsorbent material 13. A second funnel 17, disposed within the main column 12 proximate the second end 16, provides a means for directing adsorbent material 13 into the main column 12. The wide end 25 of the second funnel 17 is disposed flush with the second end 16 of the main column 12. The narrow end 23 of the second funnel 17 directs a controlled amount of the adsorbent material 13 into the main column 12.

An upper reservoir 29 is attached to the second end 16 of the main column 12 and includes an opening 31 that is aligned with the wide end 25 of the second funnel 17 in order to pass adsorbent material 13 contained within the upper reservoir 29 into the second funnel 17. A transport air separator 33 is attached to the top 35 of the upper reservoir 29. A lower reservoir 37 is disposed below the first end 14 and receives the saturated adsorbent material 13, passing from the main column 12, through the first funnel 15.

A secondary column 32, positioned parallel to and adjacent the main column 12, provides a means for transferring adsorbent material from the lower reservoir 37 to the main column 12. The secondary column 32 must be small enough to cause total fluidization of the adsorbent material particles 13. A lift blower 38, or other type of conveyor means, is attached to a top end 34 of the secondary column 32, and creates a vacuum within the secondary column 32 which draws the adsorbent material upwardly therethrough. Typical vacuum pressures within the secondary column 32 range from 3 inches water column to 15 inches water column. A transfer tube 40, connected between the lift blower 38 and the transport air separator 33, directs the adsorbent material 13 drawn up by the lift blower 38 into the transport air separator 33. The bottom end 36 of the secondary column 32 extends into the cache of adsorbent material 13 maintained within the lower reservoir 37.

Figure 2:
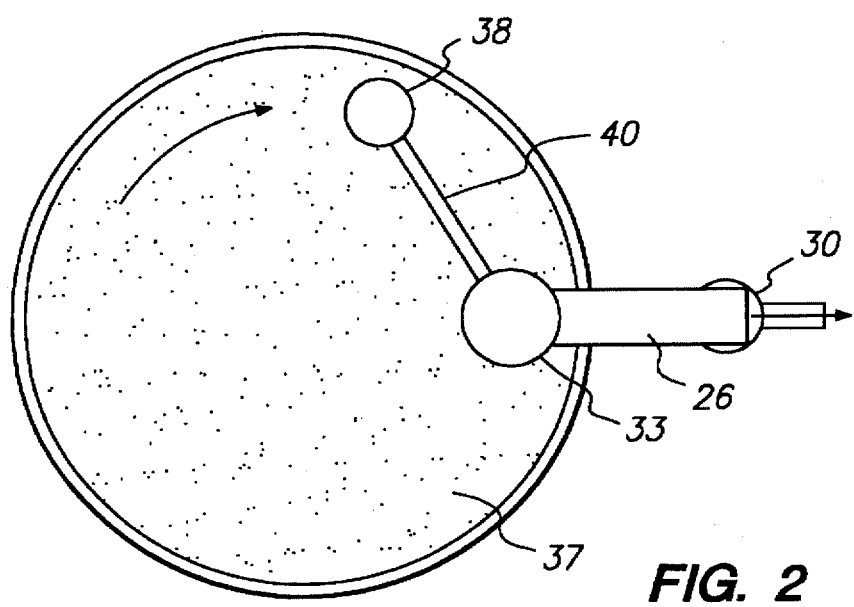
FIG. 2 is a top view of the falling bed adsorber shown in FIG. 1.

Referring now to FIG. 2, a top view of the falling bed adsorber of FIG. 1 is shown. The lift blower 38, transfer tube 40 and transport air separator 33 above the main column 12 (hidden) are positioned over the lower reservoir 37. The exit tube 26 and main blower 30 are disposed outside the lower reservoir 37.

Considering both FIGS. 1 and 2, in operation, the system 10 generally combines the contaminated exhaust air 11, indicated by the solid arrow line, with the adsorbent material 13, indicated by the dashed arrow line, within the main column 12. Volatile Organic Compounds (VOCs) in the exhaust air 11 adhere to the adsorbent material 13 and are thus removed from the exhaust air 11.

More specifically, activation of the main blower 30 creates a vacuum within the main column 12 which causes the contaminated exhaust air 11 within the inlet tube 22 to flow through the inlet port 18 into the main column 12. The exhaust air 11 then flows up the main column 12, through the exit port 20 and out the exit tube 26. Within the main column 12, the contaminated exhaust air 11 mixes with the adsorbent material 13 streaming from the upper reservoir 29 through the second funnel 17 into the main column 12. Gravity causes the adsorbent material 13 to float downwardly within the main column 12, mixing with the contaminated exhaust air 11. The velocity of the exhaust air 11 traveling upward within the main column 12 reduces the rate at which the adsorbent material 13 falls. Limiting the velocity of the exhaust air 11 flow provides that the particles of adsorbent material 13 will not be entrained and carried out of the main column 12 with the exhaust air 11 but will be suspended for a time within the main column 12. This contact method of mixing the exhaust air 11 with the adsorbent material 13 in a counter-current combination exposes the entire surface of each particle of adsorbent material 13 to the exhaust air 11 stream and maximizes the efficiency of the VOC adsorption. The velocity of the exhaust air 11 will vary with adsorbent material 13 particle size and density.

As previously stated, the diameter of the main column 12 is a function of the air flow velocity allowable for the type of adsorbent material 13 being used in the system 10. As with the preferred air flow velocity, the preferred diameter of the main column 12 will vary with the type of adsorbent material being used. Therefore, an example is needed to clearly illustrate the operation of the system 10. For our example, assume the system 10 is using a polymeric adsorbent from the Dow Chemical Company designated as XUS-43493.01. Dow XUS-43493.01, screened to 20–50 mesh, will become entrained if the air velocity exceeds 500 feet per minute. The air flow velocity must maintain the adsorbent material 13 particles in a suspended state within the main column 12 long enough to allow the particles to become saturated with the VOCs. The diameter of the main column 12 is dictated only by the system's ability to achieve a uniform distribution of falling adsorbent material 13 particles. For this example, where Dow polymer XUS-43493.01 is being used, the preferred diameter of the main column is six inches. Dow polymer XUS-43493.01 has an apparent density of 0.34 g/cc and a particle distribution size of 20–50 mesh. At an eight feet per second average linear velocity of the air flow in the main column 12, the adsorbent material 13 particles appear to slowly float down the main column 12. If the velocity of the exhaust air 11 were increased, the adsorbent material 13 particles would become entrained in the air and be carried out the exit port 20. As the adsorbent material 13 becomes saturated with VOCs, its weight increases. The saturated adsorbent material 13' overcomes the eight feet per second air flow velocity of the exhaust air 11 and falls into the wide end 21 of the first funnel 15.

Once the saturated adsorbent material 13' reaches the first funnel 15, it must exit the first end 14 to prevent the main column 12 from eventually filling up with saturated adsorbent material 13'. The first funnel 15 provides a means for directing the saturated adsorbent material 13' out of the main column 12 and into the lower reservoir 37. The first funnel 15 is also provided so that the upward path of the exhaust air 11 does not draw updrafts of ambient air into the main column 12 through the first end 14, as such updrafts would affect the transport of saturated adsorbent material 13' out of the main column 12. The first funnel 15 empties the saturated adsorbent material 13' into the lower reservoir 37.

At this point, the saturated adsorbent material 13' in the lower reservoir 37 is no longer capable of removing any further VOCs from the exhaust air 11. The saturated adsorbent material 13' must be reconditioned prior to being re-used. If the adsorbent material 13 is a polystyrene based material, it will recover its ability to adsorb if it is allowed to rest for a period of time. In the case of isopropyl alcohol, this rest period is only one minute. Since the maximum capacity of the VOCs capable of being adsorbed by the adsorbent material 13 does not result from one pass through the system 10, the adsorbent material 13 can be recycled through the system many times before it must be replaced or further reconditioned. Saturated adsorbent material 13' may be reconditioned by a desorbing process which removes the VOCs from the saturated adsorbent material 13. There are many methods common in the art to desorb. One method is to heat the saturated adsorbent material 13' with hot air to release the VOCs. The released VOCs are then withdrawn and destroyed or recovered. After the adsorbent material 13 has cooled, it is available for re-use. This heating method can by accomplished by removing the lower reservoir 37 and moving the saturated adsorbent material 13' to another container for desorbing, or by running clean hot air instead of contaminated exhaust air through the system 10 of the present invention. Another method of heating the adsorbent material 13 is by use of an infrared lamp. This method will be discussed in detail with respect to FIG. 3.

After the saturated adsorbent material 13' is reconditioned, it is drawn up through the secondary column 32 from the lower reservoir 37 by the lift blower 38. In our example where Dow XUS-43493.01 is being used as the adsorbent material 13, the preferred diameter of the secondary column 32 is 1.25 inches, as this will cause the total fluidization of the Dow polymer. The adsorbent material 13 is transmitted through the transfer tube 40 to the transport air separator 33, where it is once again dropped from the upper reservoir 29 through the second funnel 17 into the main column 12 in order to mix with more contaminated exhaust air 11 and remove the VOCs therefrom.

Examples of polymeric adsorbents that can be used in this system include, but are not limited to: Dow Chemical XUS-43493.01, XUS-43493.00, XUS-43502-01, Chematur Bonopore 110, 1120 and Rohm & Haas Ambersorb Carbonaceous Adsorbents. Some examples of VOCs that can be removed using these adsorbents are: isopropyl alcohol, ethyl lactate, benzene, toluene, styrene, perchloroethylene, trichloroethylene, methylene chloride, methyl ethyl ketone, acetone, butyl acetate and xylene.

The discussion above illustrates one cycle of the system 10 of the present invention. In the preferred embodiment, the cycle is constantly repeated, with the adsorbent material 13 being continuously recycled.

Figure 3:
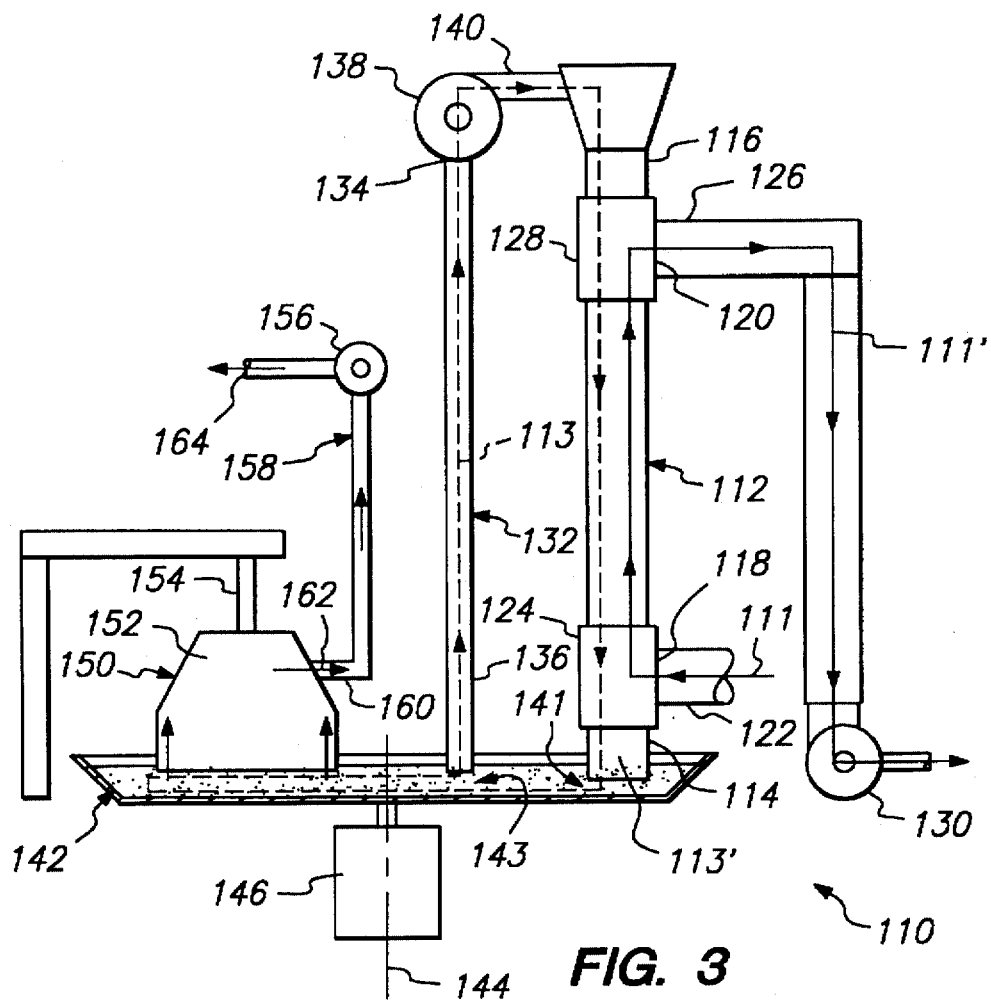
FIG. 3 is a front elevational view of an alternative embodiment of the falling bed adsorber shown in FIG. 1 having a rotational collection plate and a desorbing unit.

Referring now to FIG. 3, a front elevational view of a falling bed adsorber system 110 in accordance with an alternative embodiment is illustrated. A tubular main column 112, centrally disposed within the system, has a first end 114, a second end 116, an inlet port 118 proximate the first end 114 and an exit port 120 proximate the second end 116. An inlet tube 122 positioned perpendicularly to the main column 112 is aligned with the inlet port 118 such that contaminated exhaust air 111 flowing through the inlet tube 122 from a contaminated exhaust air source (not shown) enters the main column 112 through the inlet port 118. A first reinforcing sleeve 124 surrounds the main column 112 and maintains the inlet tube 122 in alignment with the inlet port 118.

An exit tube 126, aligned perpendicularly to the exit port 120, is attached to a second reinforcing sleeve 128. The exhaust air 111 that enters the main column 112 through the inlet port 118 is purified within the main column 112 through mixing with adsorbent material 113. The clean air 111' exits the main column 112 through the exit port 120 and flows out the exit tube 126. A main blower 130, positioned at the distal end of the exit tube 126, draws the clean air 111' out of the main column 112. The vacuum pressure in the main column 112 created by the main blower 130 causes the exhaust air 111 within the inlet tube 122 to be drawn into the main column 112 through the inlet port 118.

A secondary column 132, positioned parallel to, and adjacent, the main column 112, provides a means for transferring adsorbent material 113 to the main column 112. This column 132 must be small enough to cause total fluidization of the adsorbent material 113. A lift blower 138 is attached to a top end 134 of the secondary column 132, and creates a vacuum within the secondary column 132 which draws the adsorbent material 113 upwardly through the secondary column 132. A transfer tube 140 connected between the lift blower 138 and the second end 116 of the main column 112 directs the adsorbent material 113 drawn up by the lift blower 138 to the second end 116 of the main column 112. A bottom end 136 of the secondary column 132 is generally co-planar with the first end 114 of the main column 112.

A circularly-shaped adsorber collection plate 142 rotates about its central axis 144 by a motor 146 having an adjustable speed. Preferably, the speed of rotation is one revolution per minute, and is timed to allow the adsorbent material 113 to recover prior to being recycled. Recycling of the adsorbent material 113 is discussed in detail below with respect to the operation of the system 110. The collection plate 142 contains the bulk of the adsorbent material 113 utilized by the system 110. The first end 114 of the main column 112 and the bottom end 136 of the secondary column 132 both burrow into the adsorbent material 113 but do not touch the collection plate 142. A first gap 141 is provided between the burrowed first end 114 and the collection plate 142 to create a gas seal that prohibits air from entering the first end 114, while still allowing the collection plate 142 to spin. Likewise, a second gap 143 is provided between the bottom end 136 of the secondary column 132 and the collection plate 142.

An infrared lamp 150 is positioned over a portion of the collection plate 142, close to the adsorbent material 113. Preferably, the infrared lamp 150 has 500 to 1000 watts of power and generates up to 130 degrees Celsius of heat. The heat generated by the infrared lamp 150 releases the VOCs from the saturated adsorbent material 113'. The infrared lamp 150 further includes a lamp shield 152 that extends from a lamp support 154. The lamp shield 152 collects the released VOCs. A transfer blower 156 draws the released VOCs from the lamp shield 152, moves the VOCs through a transfer tube 158 attached at a first end 160 to an aperture 162 in the lamp shield 152, through which the VOCs are transmitted to a condenser or oxidizer (not shown) attached to a second end 164 of the transfer tube 158 for proper waste disposal. A test probe (not shown) can also be attached to the lamp shield 152 to sample the concentration of VOCs being removed from the saturated adsorbent material 113'. Where the level of VOCs within the incoming contaminated exhaust air 111 is known, the efficiency of the system can be calculated using the reading from the test probe.

Figure 4:
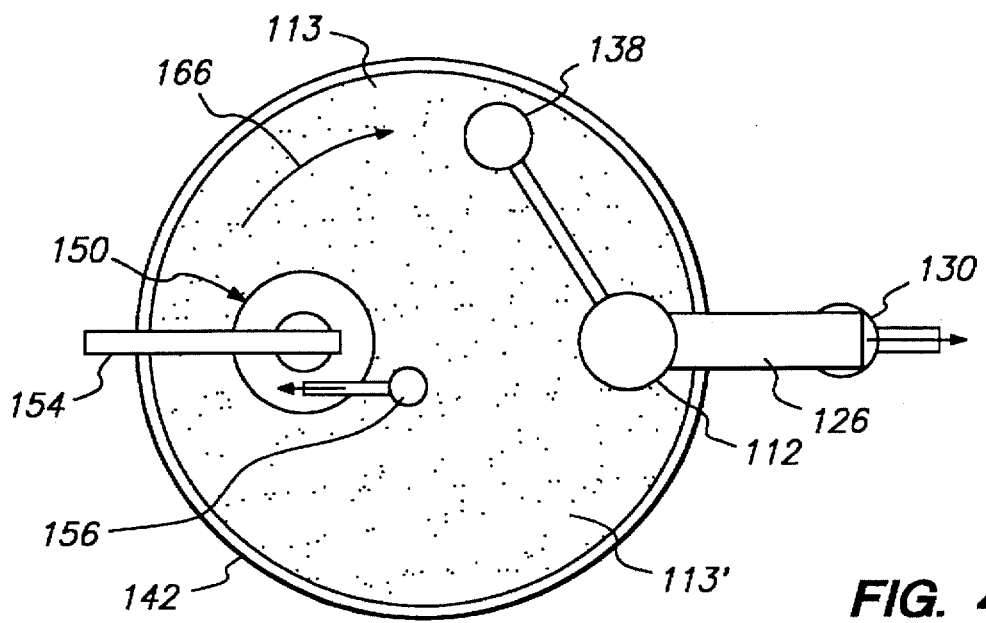
FIG. 4 is a top view of the alternative embodiment shown in FIG. 3.

Referring now to FIG. 4, a top view of the falling bed adsorber of FIG. 3 is shown. The circular collection plate 142 rotates in a clockwise pattern, as shown by the arrow 166. The infrared lamp 150, main column 112 and secondary column 132 are disposed in a generally triangular arrangement with respect to each other. The rotation of the collection plate 142 causes the saturated adsorbent material 113; being removed from the main column 112 to pass under the infrared lamp 150, where it is desorbed. The reconditioned adsorbent material 113 then passes under the secondary column 132, where it is transported to the second end 116 of the main column 112. The clockwise direction of the collection plate 142 is necessary for the recycling of the adsorbent material 113 within the system 110.

Considering now both FIGS. 3 and 4, activation of the main blower 130 creates a vacuum within the main column 112 causing the contaminated exhaust air 111 within the inlet tube 122 to flow through the inlet port 118 into the main column 112. The exhaust air 111 then flows up the main column 112, through the exit port 120 and out the exit tube 126. Within the main column 112, the contaminated exhaust air 111 mixes with the adsorbent material 113. The adsorbent material 113 is introduced into the main column 112 at the second end 116 via the lift blower 138. Gravity causes the adsorbent material 113 to float downwardly within the main column 112, mixing with the contaminated exhaust air 111. This contact method exposes the entire surface of each particle of adsorbent material 113 to the exhaust air 111 stream. The velocity of the exhaust air 111 traveling upward within the main column 112 reduces the rate at which the adsorbent material 113 falls. Limiting the velocity of the exhaust air 111 flow provides that the particles of adsorbent material 113 will not be entrained and carried out of the main column 112 with the exhaust air 111. This velocity will vary with adsorbent particle size and density. As the adsorbent material 113 becomes saturated with VOCs, it falls to the collection plate 142 at the first end 114 of the main column 112.

Once the adsorbent material 113 reaches the bottom of the main column 112, it must exit the first end 114 to prevent the main column 112 from eventually filling up with adsorbent material 113. The first end 114 is under a slight negative pressure as a result of the vacuum created within the main column 112 by the main blower 130. The first end 114 must therefore be sealed to prevent ambient air from being drawn into the main column 112 through the first end 114, however it must also remain open to allow the adsorbent material 113 to exit the main column 112. This is accomplished by providing a first gap 141 between the first end 114 of the main column 112 and the collection plate 142. Prior to operation of the system 110, adsorbent material 113 is preferably poured down through the main column 112 until a one to two-inch thick layer of adsorbent material 113 rests at the first end 114 of the main column 112. During operation, the collection plate 142 rotates causing removal of the adsorbent material 113 from the main column 112 as a result of the presence of the first gap 141. The adsorbent material 113 is removed from the main column 112 at the same rate that the adsorbent material 113 within the main column 112 becomes saturated and falls to the first end 114. Therefore, a one to two-inch layer of adsorbent material 113 is maintained at the first end 114 of the main column 112 at all times, and it is this material that creates the gas seal. The rate of removal of the saturated adsorbent material 113' is controlled by the width of the first gap 141 and the rate of rotation of the collection plate 142.

The clockwise rotation of the collection plate 142 transfers the removed saturated adsorbent material 113' from the main column 112 and passes it underneath the infrared lamp 150. The infrared lamp 150 heats the saturated adsorbent material 113' causing the VOCs to release their adherence. The VOCs are collected by the lamp shield 152, drawn into the transfer tube 158 by the transfer blower 156, and output to a treatment facility. Following the removal of the VOCs from the adsorbent material 113, the adsorbent material 113 is ready to again be released into the main column 112 in order to adsorb VOCs from contaminated exhaust air 111. The clockwise rotation of the collection plate 142 passes the adsorbent material 113 from the infrared lamp 150 to underneath the bottom end 136 of the secondary column 132. The lift blower 138 draws the adsorbent material 113 up from the collection plate 142, through the secondary column 132, and transmits the adsorbent material 113 to the second end 116 of the main column 112, where the adsorbent material 113 is once again dropped into the main column 112. The adsorbent material 113 again mixes with more contaminated exhaust air 111 and the VOCs are removed therefrom.

The discussion above illustrates one cycle of the system 110 of the alternative embodiment. This cycle is constantly repeated, with the adsorbent material 113 being used, desorbed, and recycled continuously.

The invention has now been explained with reference to specific embodiments. Other embodiments will be apparent to those of ordinary skill in the art in light of this disclosure. Therefore, it is not intended that this invention be limited, except as indicated by the appended claims.

What is claimed is:

1. A method for removing volatile organic compounds from contaminated air using absorbent material, comprising the steps of:
   (i) controlling a flow of contaminated air through a column, the column having a bottom end, a top end, an exhaust port near the top end, and an intake port near the bottom end;
   (ii) releasing in the column, from a position below the exhaust port, adsorbent material into the flow of the contaminated air, whereby the adsorbent material is mixed with the contaminated air and suspended in the column; and
   (iii) removing the adsorbent material which is saturated with volatile organic compounds from the bottom end of the main column.

2. The method of claim 1, further comprising the steps of:
   (iv) desorbing volatile organic compounds from the adsorbent material from the removing step (iii); and
   (v) transferring to the first end of the main column the adsorbent material from the desorbing step (iv).

3. The method of claim 2, wherein said desorbing step (iv) includes the step of heating the adsorbent material until the volatile organic compounds are released.

4. The method of claim 2, wherein prior to step (i) is the step of sealing the bottom end of the column with adsorbent material.

5. The method of claim 2, wherein following the step (ii) of releasing the adsorbent material is the step of adjusting the velocity of the flow of contaminated air to expose an entire surface area of the adsorbent material to the contaminated air.

6. The method of claim 2, wherein following the step (iii) of removing the adsorbent material which is saturated with volatile organic compounds is the step of transferring to a heat source the adsorbent material which is saturated with volatile organic compounds.

7. A method for using adsorbent material to remove volatile organic compounds from a stream of contaminated air, comprising the steps of:
   forcing the contaminated air through a chamber at a rate sufficient to support adsorbent material; and
   releasing adsorbent material into the contaminated air flowing through the chamber, whereby the adsorbent material is suspended by the contaminated air flowing through the chamber.

8. An apparatus for using adsorbent material to remove volatile organic compounds from a stream of contaminated air, comprising:
   a hollow main column for containing and mixing contaminated air and adsorbent material therein, the main column having a first end and a second end;
   an airflow device for creating an airflow of contaminated air within the main column; and
   a release element coupled to the main column for containing the adsorbent material and releasing the contained absorbent material into the airflow of contaminated air within the main column.

9. The apparatus of claim 8 wherein the main column is disposed generally vertically and includes an inlet port proximate the second end and an exit port proximate the first end, an inlet tube attached to the inlet port and an exit tube attached to the exit port;
   wherein the airflow device is attached to the exit tube for inducing vacuum pressure within the main column and causing the contaminated air to enter the main column through the inlet port and exit through the exit port.

10. The apparatus of claim 8 wherein: the adsorbent material is suspended in the contaminated air for adsorbing the volatile organic compounds, and an entire surface area of the suspended adsorbent material is exposed to the contaminated air.

11. The apparatus of claim 8 further comprising means coupled to the second end of the main column for reconditioning the adsorbent material which has adhering volatile organic compounds.

12. The apparatus of claim 11 further comprising a transfer device for transferring adsorbent material from the second end to the first end of the main column.

13. The apparatus of claim 12 wherein the means for reconditioning comprises:
   collection means for collecting from the second end of the main column adsorbent material which has adhering volatile organic compounds; and
   a heat source positioned over a portion of the collection means for heating the adsorbent material held by the collection means, whereby the volatile organic compounds adhering to the adsorbent material are released from the adsorbent material.

14. The apparatus of claim 13 wherein the heat source is an infrared lamp.

15. The apparatus of claim 13 wherein the second end of the main column and the collection means are separated by a gap of a predetermined width.

16. The apparatus of claim 13 wherein the transfer device further comprises:
   a secondary column having a third end and a fourth end; and
   means for moving the collection means having the adsorbent material from the heat source to the third end of the secondary column.

17. The apparatus of claim 12 wherein the transfer device further comprises:

a secondary column having a third end and a fourth end; and conveyance means for conveying the adsorbent material from the third end to the fourth end.

18. The apparatus of claim 17 wherein the conveyance means is an air lift blower.

19. An apparatus for using adsorbent material to remove volatile organic compounds from a stream of contaminated air, comprising:

a hollow main column for containing and mixing contaminated air and adsorbent material therein, the main column being disposed generally vertically and having a first end and a second end;

an airflow device for creating an airflow within the main column in order to cause and control a flow of the contaminated air through the main column such that the adsorbent material is suspended in the contaminated air, whereby an entire surface area of the suspended adsorbent material is exposed to the contaminated air; and reconditioning means for removing volatile organic compounds adhering to the adsorbent material and for transferring from the second end to the first end of the main column adsorbent material from which volatile organic compounds have been removed.

20. An apparatus for using absorbent material to remove volatile organic compounds from a stream of contaminated air, comprising:

a chamber having an intake port and an exhaust port;

means connected to the intake port and exhaust port for forcing contaminated air through the chamber at a rate sufficient to support absorbent material; and means disposed within the chamber between the intake port and the exhaust port for releasing absorbent material into the chamber, whereby the absorbent material is suspended by the contaminated air flowing through the chamber.

21. An apparatus for using adsorbent material to remove volatile organic compounds from a stream of contaminated air, comprising:

means for containing contaminated air and adsorbent material therein;

means for creating an airflow of contaminated air within said means for containing such that the adsorbent material is suspended in the contaminated air for adsorbing the volatile organic compounds; and means coupled to said containing means for releasing adsorbent material into the airflow of contaminated air within said means for containing.

* * * * *